(12) United States Patent
Turner (10) Patent No.: US 9,179,759 B1
(45) Date of Patent: Nov. 10, 2015

(54) CONVERTIBLE HAMMOCK FOR A VEHICLE OR GROUND STAND

(76) Inventor: Jeff Turner, Penhook, VA (US)

( * ) Notice: Subject to any disclaimer, the term of this patent is extended or adjusted under 35 U.S.C. 154(b) by 716 days.

(21) Appl. No.: 13/409,383

(22) Filed: Mar. 1, 2012

Related U.S. Application Data (60) Provisional application No. 61/449,340, filed on Mar. 4, 2011, provisional application No. 61/491,418, filed on May 31, 2011.

(51) Int. Cl.
*A45F 3/24* (2006.01)
*A45F 3/22* (2006.01)
*A47C 17/80* (2006.01)
*A47C 17/64* (2006.01)

(52) U.S. Cl.
CPC .... *A45F 3/24* (2013.01); *A45F 3/22* (2013.01)

(58) Field of Classification Search
CPC ............. A45F 3/24; A45F 3/22; A47C 17/80; A47C 17/76; A47C 17/64; B60P 3/38; B60P 3/39; B60P 3/32; B60P 3/34; B60P 3/341; B60P 3/36
USPC ............. 5/128, 127, 129, 120, 121, 110, 112, 5/113, 118, 119; 296/159, 163, 168–170, 296/174
See application file for complete search history.

(56) References Cited

U.S. PATENT DOCUMENTS

| | | | |
|---|---|---|---|
| 851,957 A * | 4/1907 | Fyfe | 261/147 |
| 2,524,499 A * | 10/1950 | Weir | 5/127 |
| 2,563,156 A * | 8/1951 | Carl | 5/2.1 |
| 3,593,352 A * | 7/1971 | Britt | 5/127 |
| 3,757,360 A * | 9/1973 | Wescott | 5/113 |
| 4,739,528 A | 4/1988 | Allen | |
| 4,887,823 A * | 12/1989 | Hallett et al. | 280/19 |
| 5,042,517 A * | 8/1991 | Stewart | 135/90 |
| 5,170,521 A | 12/1992 | Light | |
| 5,647,075 A * | 7/1997 | Perkins | 5/127 |
| 5,740,570 A * | 4/1998 | Hsieh | 5/129 |
| 5,857,230 A * | 1/1999 | Dowdy | 5/118 |
| 5,911,399 A * | 6/1999 | Mannion | 248/514 |
| 5,913,772 A * | 6/1999 | Clark | 5/121 |
| 6,070,926 A * | 6/2000 | Hardin | 296/26.08 |
| 6,098,218 A * | 8/2000 | Ventura | 5/113 |
| 6,179,368 B1 * | 1/2001 | Karlsson | 296/161 |
| 6,230,340 B1 | 5/2001 | Edwards | |
| 6,276,008 B1 * | 8/2001 | Chen | 5/127 |
| 6,418,577 B1 * | 7/2002 | Murphy | 5/127 |
| 6,513,690 B1 * | 2/2003 | Churchill et al. | 224/498 |
| 6,715,168 B2 * | 4/2004 | Williams | 5/414 |
| 6,739,643 B1 * | 5/2004 | Rock et al. | 296/64 |
| 6,829,792 B2 | 12/2004 | Braly | |
| 6,871,896 B1 * | 3/2005 | Owen | 296/26.11 |
| 6,895,612 B1 | 5/2005 | Hamilton | |
| 7,021,694 B1 | 4/2006 | Roberts et al. | |

(Continued)

*Primary Examiner* — Robert G Santos
(74) *Attorney, Agent, or Firm* — Charles Sara (57) ABSTRACT

The present invention is directed to a hammock system and particularly to a convertible hammock for use on a ground stand, on the bed of truck or similar vehicle and attached to a standard vehicle trailer hitch. The hammock includes a support structure at the head and the foot of the hammock which comprises a vertically directed post. The base stand includes a receptacle for receiving the post. In addition, the post can be equally adapted for slidable reception into utility slots which are already positioned within the side walls of the bed of most pickup trucks or similar vehicles. In addition, the present invention can be directed for use with a trailer hitch component on a typical vehicle.

15 Claims, 5 Drawing Sheets

(56) References Cited

U.S. PATENT DOCUMENTS

| | | |
|---|---|---|
| 7,073,216 B2 | 7/2006 | Schwingeler et al. |
| 7,073,857 B1 * | 7/2006 | Bailey .................. 297/217.7 |
| 7,089,610 B2 | 8/2006 | Zhong |
| 7,243,966 B1 * | 7/2007 | Sheldon .................. 296/26.08 |
| 7,886,948 B2 * | 2/2011 | Kerr .................. 224/519 |
| 8,584,276 B1 * | 11/2013 | Wilson .................. 5/119 |
| 2003/0145378 A1 * | 8/2003 | Williams .................. 5/113 |
| 2008/0006666 A1 * | 1/2008 | Kerr .................. 224/524 |
| 2009/0288589 A1 | 11/2009 | Hammen |

* cited by examiner

CONVERTIBLE HAMMOCK FOR A VEHICLE OR GROUND STAND

CROSS-REFERENCE TO RELATED APPLICATIONS

This application claims priority to U.S. provisional patent application 61/449,340 filed Mar. 4, 2011 in the name of Jeff Turner, entitled "Convertible Truck Bed Hammock," and to U.S. provisional patent application 61/491,418 in the name of Jeff Turner, entitled "Convertible Hammock for a Vehicle," and incorporates the entire disclosures herein.

FIELD OF THE INVENTION

The present invention is directed to a hammock system and particularly to a convertible hammock for use on a ground stand, on the bed of truck or similar vehicle and attached to a standard vehicle trailer hitch.

BACKGROUND

A hammock has been known for years to assist primarily with the pleasure of sleeping outdoors. The beauty of the hammock is that it can be compact and comfortable without necessarily requiring many working parts. Hammocks typically consist of a sturdy fabric material supported on each end by a rope or chain, which can be tied to a tree, post or the like. In addition, hammocks can include structural support rods to add integrity to each end of the hammock. Rather than tying the hammock to a tree or a post, the hammock can also be placed on a base specifically designed for the hammock. In addition, hammocks have been designed for placement on land and water vehicles. For example, U.S. Pat. No. 6,230,340 to Edwards discloses a camper cot assembly for use on the bed of a pickup truck. It includes a frame and a sturdy fabric. The ends of the frame are designed to be supported directly on the tops of the sides of the truck. U.S. Pat. No. 5,170,521 to Light is directed to a portable sleeper for a truck, which uses four anchors connected to posts at the four corners of the truck's bed. U.S. Pat. No. 4,738,528 to Allen is directed to a tie-down system for securing articles in the bed of a pickup truck. The system can also substitute as a sleeping surface. U.S. Patent Publication 2009/0288589 to Hammen is directed to a boat lounge with a fabric that spans across the beam of a boat.

While all of these patents disclose hammocks for use on vehicles, there is no disclosure of a convertible hammock which is designed to be used with ease on a ground base system, as well as a vehicle.

SUMMARY OF THE INVENTION

The present invention is directed to a convertible hammock bed system which is adaptable for use on both a ground base stand and on a vehicle. Advantageously, the hammock of the present invention includes a support structure at the head and the foot of the hammock which comprises a vertically directed post. The base stand includes a receiving slot for the post. In addition, the post can be equally adapted for slidable reception into slots which are already positioned within the side walls of the bed of most pickup trucks or similar vehicles. In addition, the present invention can be directed for use with a trailer hitch component on a typical vehicle.

The present invention is further directed to a convertible hammock for placement on the ground and on a vehicle. The hammock includes a first and second support structure, wherein each support structure comprises a center post having a first and second end, wherein the first end of the center post is attached to a cross bar in a generally perpendicularly oriented manner with respect to the center post, wherein each cross bar has a first end and a second end. The hammock further includes a fabric covering extending from the cross bar of the first support structures to the cross bar of the second support structure. Finally, the hammock includes a first receptacle for receiving the second end of the first support structure and a second receptacle for receiving the second end of the second support structure, wherein the first and second receptacles maintain the center posts of the first and second support structures in a generally vertical position.

The present invention is further directed to a hammock and stand combination comprising a first and second support structure, wherein each support structure comprises a center post having a first and second end, wherein the first end of the center post is attached to a cross bar in a generally perpendicularly oriented manner with respect to the center post, wherein each cross bar has a first end and a second end; a fabric covering extending from the cross bar of the first support structures to the cross bar of the second support structure; a ground stand support comprising a pair of opposing legs having a base portion wherein the opposing legs elevate from the base portion and include opposing runners to a pair of matched and opposing first and second receptacles, wherein the first receptacle slidably receives the second end of the first support structure and the second receptacle slidably receives the second end of the second support structure, wherein further the first and second receptacles maintain the center posts of the first and second support structures in a generally vertical position.

Still further, the present invention is directed to a hammock for use on a truck having a truck bed having opposing first and second bed sides defining the truck bed and extending upward therefrom, each bed side having a series of utility slots, comprising: a first and second support structure, wherein the first support structure comprises a first center post having a first and second end, wherein the first end is attached to a first cross bar in a generally perpendicularly oriented manner with respect to the first center post, and the second support structure comprises a second support post having a first and second end, wherein the first end is attached to a second cross bar in a generally perpendicularly oriented manner with respect to the second center post, wherein each cross bar has a first end and a second end, and wherein the second end of the first center post is slidably received within a utility slot on the first bed side and the second end of the second center post is slidably received with an opposing utility slot on the second bed side; and a fabric covering extending from the cross bar of the first support structures to the cross bar of the second support structure.

The invention is also directed to a hammock for use on a vehicle having a trailer hitch, comprising a trailer hitch support mechanism comprising an extension bar having a first and second end, wherein the extension bar connects to the trailer hitch at its first end and extends from the trailer hitch to a generally perpendicularly placed support bar having first and second ends, wherein the first and second ends of the support bar extend to receive hammock receptacles; a first and second support structure, wherein the first support structure comprises a first center post having a first and second end, wherein the first end is attached to a first cross bar in a generally perpendicularly oriented manner with respect to the first center post, and the second support structure comprises a second support post having a first and second end, wherein the first end is attached to a second cross bar in a generally perpendicularly oriented manner with respect to the second center post, wherein each cross bar has a first end and a second end, and wherein the second end of the first center post is slidably received within a utility slot on the first bed side and the second end of the second center post is slidably received with an opposing utility slot on the second bed side; and a fabric covering extending from the cross bar of the first support structures to the cross bar of the second support structure.

The objects and advantages of the invention will appear more fully from the following detailed description of the preferred embodiment of the invention made in conjunction with the accompanying photographs and drawings.

DETAILED DESCRIPTION OF THE INVENTION

Figure 1:
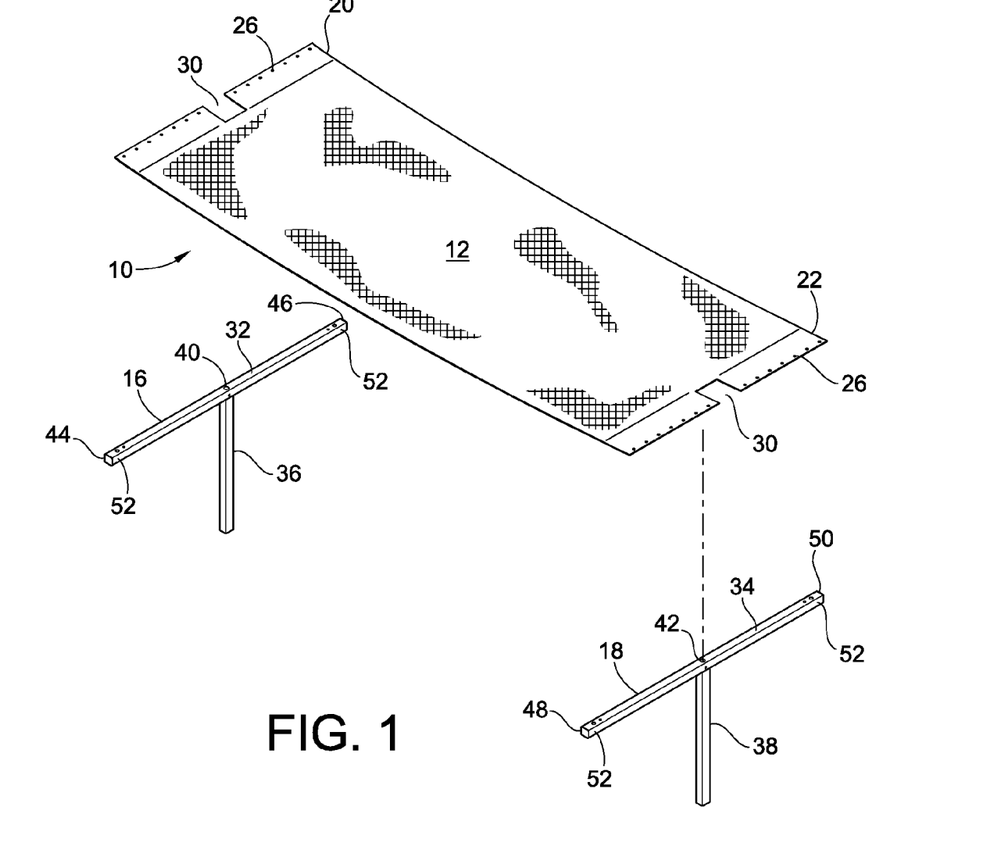
FIG. 1 is an exploded, perspective view of the hammock of the present invention in combination with the hammock support structures.

Referring to the figures, and particularly FIG. 1, the present invention is directed to a hammock 10 comprising a bed 12 and opposing support structures 16, 18 located at the head 20 and foot 22 of the bed 12. The bed 12 is made of typical hammock material, such as canvas, cloth, roping or other preferably flexible materials. While the bed 12 can be attached to the support structures 16, 18 by any of a number of ways, such as annealing the bed 12 to the support structures 16, 18 by glue or the like, or clamping the bed 12 to the structures 16, 18, a common and preferred method of attachment is illustrated with respect to FIGS. 1-3. The head 20 and foot 22 of the bed 12 include openings 26 which can be "hole-punched" into the bed fabric and supported by a grommet or the like. Each end 16, 18 of the bed 12 can then be fastened to the support structures 16, 18 by attachment means, such as attachment bolts 28. If desired, the bed 12 can include a cut away portion 30, the purpose of which will be described later in this disclosure.

Figure 2:
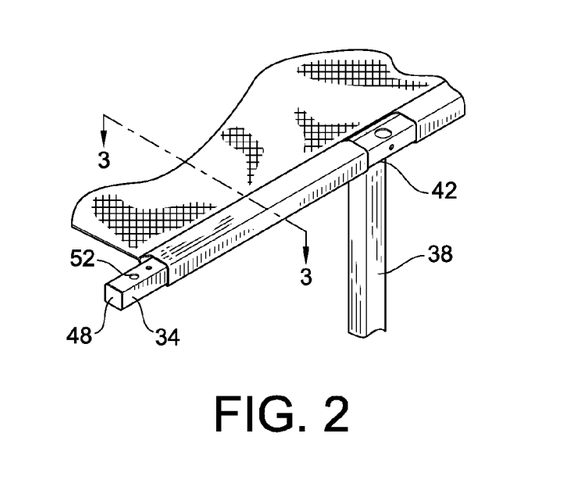
FIG. 2 is a partial perspective view of the hammock of FIG. 1 illustrating the hammock fabric attached to one of the hammock support structures.
Figure 3:
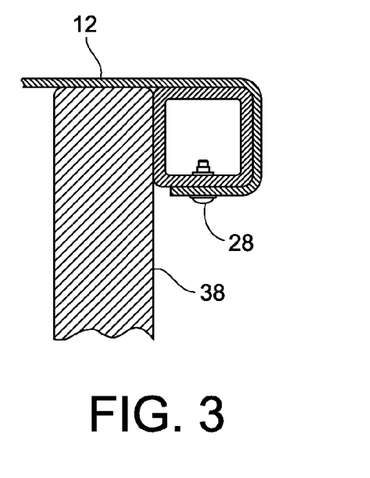
FIG. 3 is a cross-sectional view of the hammock attached to the hammock support structure taken at lines 3-3 of FIG. 2.

Referring now to FIGS. 2 and 3, the support structures 16, 18 are virtually identical and include horizontally placed cross bars 32, 34 attached to center posts 36, 38, respectively at the mid-center portion 40, 42 of each center post 36, 38. Cross bar 32 is defined by a first end 44 and a second end 46. Cross bar 34 is defined by a first end 48 and a second end 50. While the center posts 36, 38 are illustrated as having a square cross section, with the sides approximately 2-4 inches in length, it is within the scope of the invention to provide a post having other shapes, such as a circular shape, oval shape, or the like. As will be described later in the disclosure, the importance of the shape of the posts 36, 38 is that they must fit within an opening in the side of a pickup truck or other vehicle or a ground stand as described later with reference to FIGS. 4, 6 and 7. The length of the center posts 36, 38 can range from a few inches to four feet or more, with a typical length of about three feet. The length of the cross bars 32, 34 can range from one foot to six feet or more, with a typical length of about three feet. Thus, the bed 12 is designed to be attached to the cross bars 32, 34 of each of the support structures 16, 18 to form the hammock 10.

Figure 4:
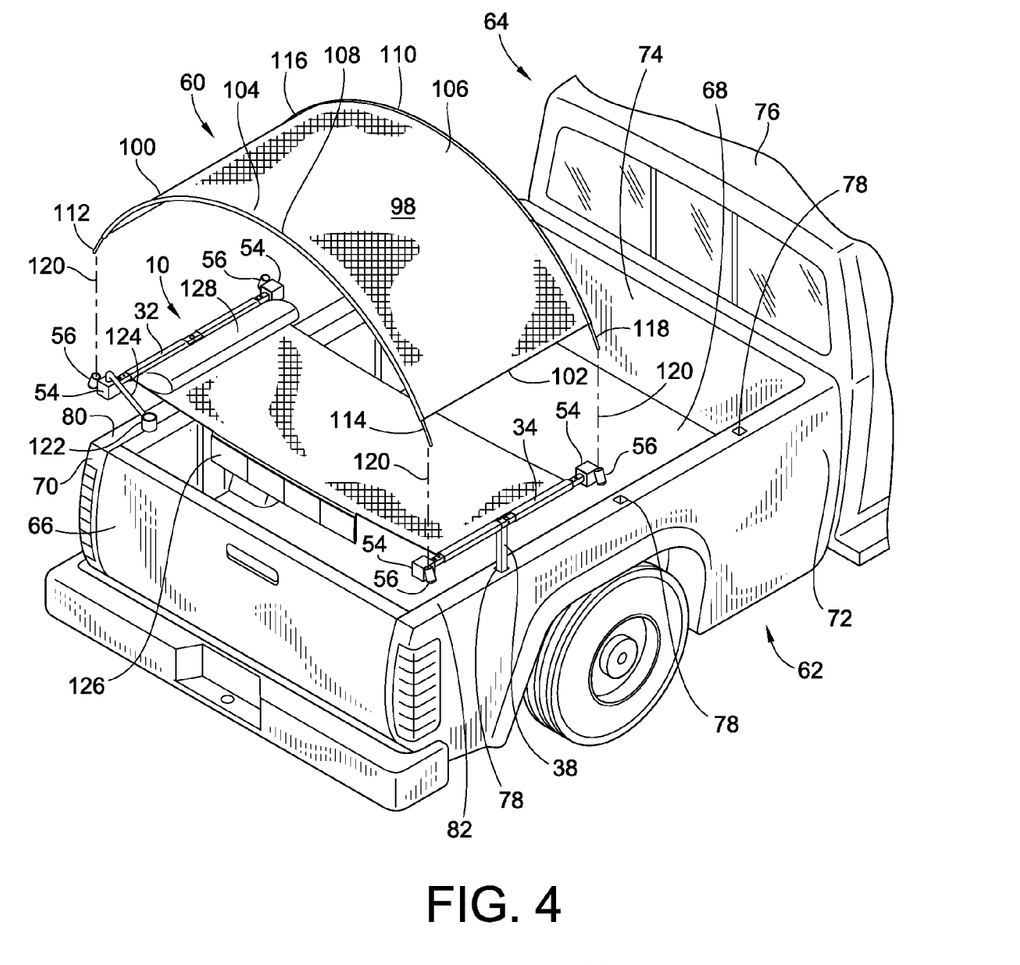
FIG. 4 is a perspective view of the hammock of the present invention positioned on the bed of a pick-up truck.

In addition, receiving channels 52 can be positioned at each of the ends 44, 46, 48, 50 of the cross bars 32, 34 for placement of a canopy 60 as illustrated in FIG. 4. The receiving channels 52 can be in the form of openings in the cross bars 32, 34 as illustrated in FIGS. 1 and 2, or the receiving channels 52 can be cover extensions 54 which slidably fit onto and are secured to the ends 44, 46, 48, 50 of the cross bars 32, 34 as illustrated in FIG. 4. As illustrated in FIG. 4, the cover extensions 54 include angled chambers 56 for receiving the canopy 60.

Reference is now made to FIG. 4, which illustrates the bed 62 of a pickup truck 64 or similar vehicle. The pickup truck bed 62 includes a tailgate 66, floor 68, opposing side walls 70 and 72 and front wall 74. Located beyond the front wall 74 is the cab partially illustrated at 76 of the truck 64. The side walls 70 and 72 of the pickup truck bed 62 include a series of vertically placed utility slots 78 on the upper edges 80 and 82 of the side walls 70, 72 respectively. There are typically two to three utility slots 78 on each of the upper edges 80, 82. In addition, the utility slots 78 are typically positioned directly opposed to each other on the upper edges 80, 82. Advantageously, the hammock 10 of the present invention is adapted to be removably and securely placed on the bed 62 by placing the posts 36, 38 of each support structure 16, 18 slidably within the utility slots 78 in the side walls 70, 72. Once positioned, the hammock 10 can be utilized as a bed, as illustrated in FIG. 4. A person can comfortably lie down upon the bed 12. The support structures 16, 18 stabilize and maintain the bed 12.

Figure 5A:
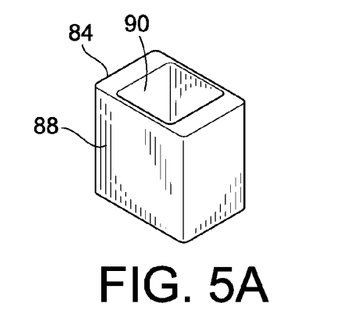
FIGS. 5A and 5B are perspective views of shims designed for insertion into the utility slots on the truck bed sides to accommodate different dimensions in the upright posts.
Figure 5B:
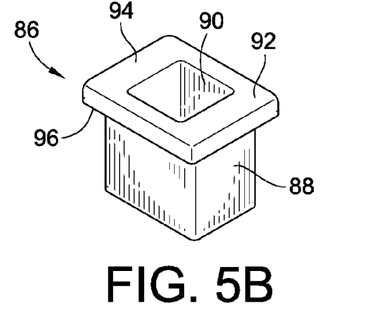

Referring now to FIG. 5, it is also within the scope to provide shims 84 and 86, generally made of rubber or plastic for placement within the utility slots 78 in the sidewalls 70, 72 to accommodate a center post 36, 38 on the hammock 10, which may have a smaller dimension than the utility slots 78. The shims 84, 86 are necessary to accommodate the variance in the manufacturing protocol between different makes of vehicles. In this manner, a standard size post 16, 18 can be prepared for the hammock 10 without the necessity of customizing the size of the center posts 36, 38 to fit different dimensions of utility slots 78 in different vehicles. The shims 84, 86 will also accommodate different shaped posts. Typical shims 84, 86 come in two shapes, as illustrated in FIGS. 5A and 5B. As illustrated in FIG. 5A, the shim 84 is defined by opposing walls 88 which form an interior channel 90. The shim 88 can conveniently be slidably placed with the interior of the utility slots 78 for securing the center posts 36, 38 of the support structures 16, 18. Alternatively or in addition to the shim 84, the shim 86 of FIG. 5B includes a collar 92 having an upper surface 94 and a lower surface 96. Therefore, shim 86 is designed for placement on the upper edges 80, 82 of the sidewalls 70, 72 of the bed 62 for enhanced securing of the posts 36, 38 within the sidewalls 70, 72 of the bed 62.

Figure 8:
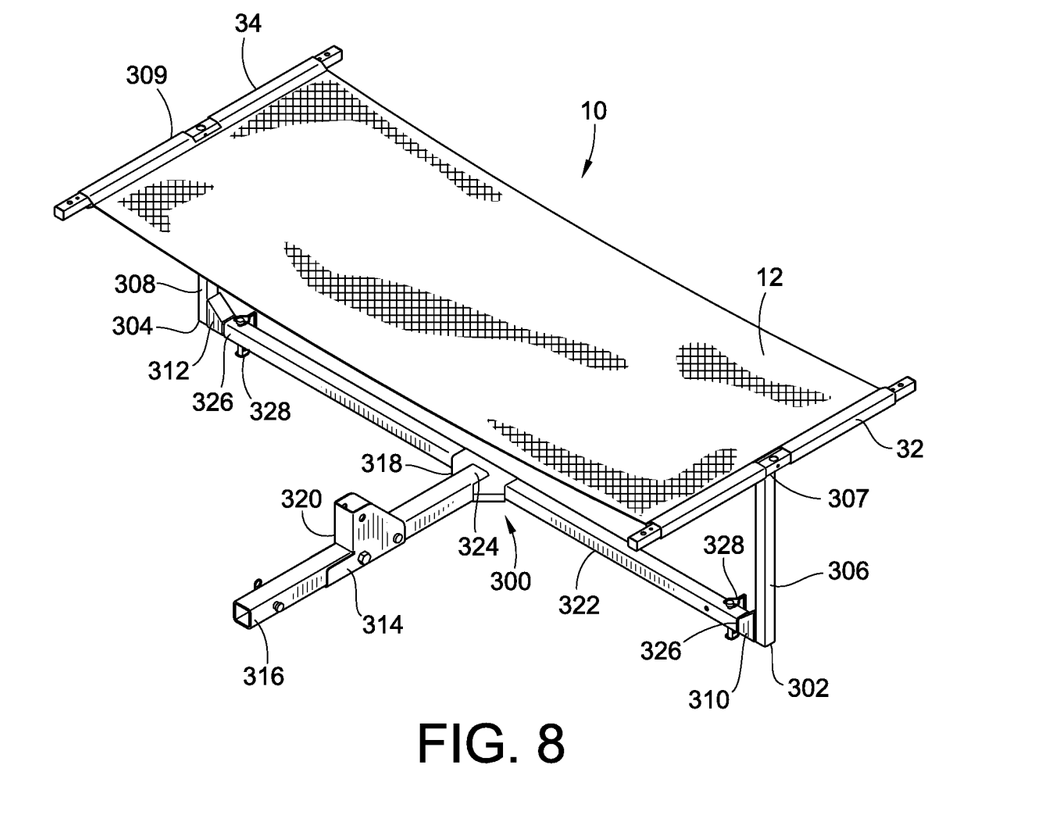
FIG. 8 is a perspective view of the rear of a vehicle illustrating a trailer hitch extension bar for receiving the hammock of the present invention.

Reference is continued to be made to FIG. 8 for some complementary features of the hammock 10. As illustrated and described previously, the removable canopy 60 includes a preferably flexible sheet 98 of sun or element shading material, such as canvas, plastic or other materials, having a first end 100, a second end 102, and parallel side edges 104, 106. The side edges 104, 106 are defined by preferably flexible poles 108, 110 having ends 112, 114 and 116, 118 respectively. While the poles 108, 110 can be rigid, arcuate shaped poles as shown in FIG. 4, it is preferable for the poles 108, 110 to be made of a flexible, resilient, plastic or metallic material allowing the respective ends 112, 114, 116, 118 to be slidably inserted either in the chambers 56 attached to the cover extensions 54 according to phantom guidelines 120, or directly in the receiving channels 52, illustrated in FIG. 1. As further illustrated in FIG. 4, a cup holder 122 may be rotatably attached to the cross bars 32, 34 by means of a cup holder arm 124. In addition, utility pockets 126 may be attached or sewn to the bed 12 of the hammock 10 for convenience, such as holding magazines and the like. Further, a pillow 128 may be attached to hammock 10 for comfort.

Figure 6:
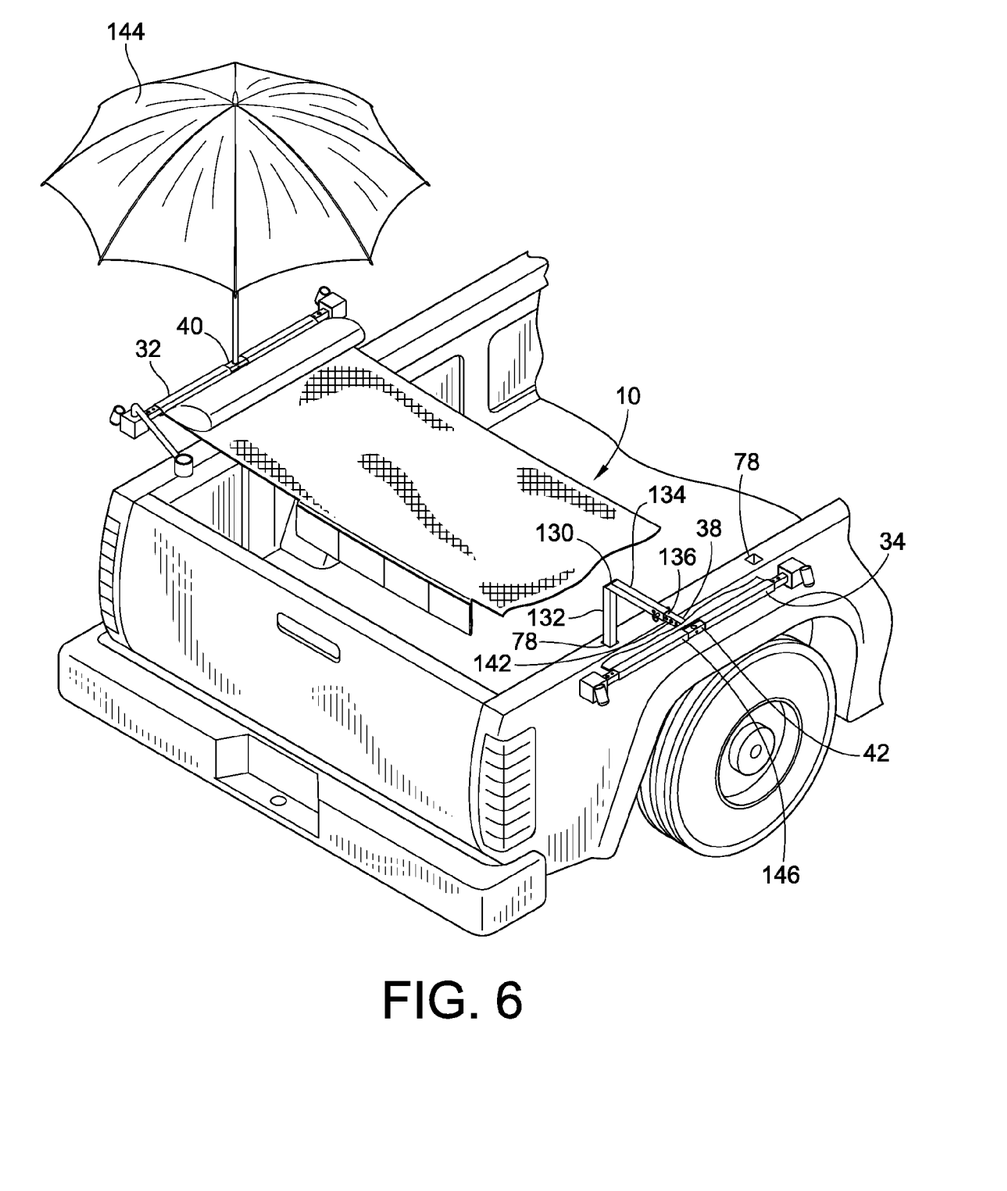
FIG. 6 is a perspective view of the hammock of the present invention connected to the side walls of the pick-up truck and utilizing at least one extension member.

If the side walls 70 and 72 are positioned too close together to provide a comfortable length for the hammock 10, a right-angle extension 130, as illustrated in FIG. 6, can optionally be positioned between the utility slot 78 and the support structure 16, 18. The extension 130 includes an upright support 132 for slidable placement within the utility slot 78. A generally horizontal arm 134 is fixedly attached to the upright support 132 in a roughly 90 degree angle located at the proximal end 136 of the arm 134. The center posts 36, 38 can then be slidably inserted within the arm 134 at the distal end 138 and secured to the arm 134 by a key 140 or other securing mechanism known to the art. As is illustrated in FIG. 6, arm 134 can include a series of openings 142 to slidably lock the center posts 36, 38 to the arm 134 at different lengths to form a telescoping extension to lengthen or shorten the total length of the hammock 10 as desired. Referring again to FIG. 6, an alternate shading device can include an umbrella 144 designed to be placed within a receiving channel 146 located at the mid center portion 40, 42 of the cross bars 32, 34.

Figure 7:
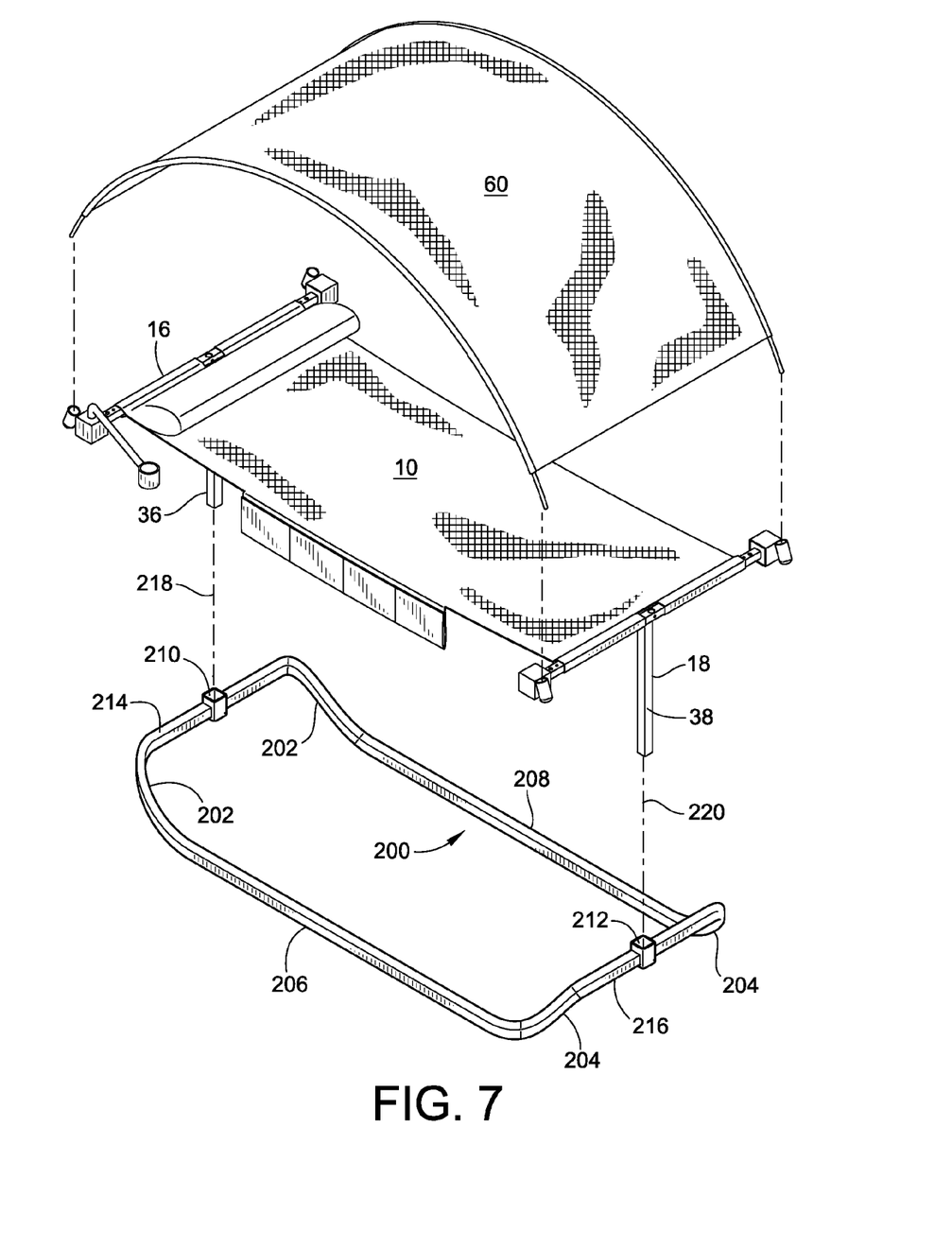
FIG. 7 is a perspective exploded view of the hammock of the present invention connected to a ground stand.

Reference is now made to FIG. 7 for an alternative embodiment to the present invention. Instead of mounting the hammock 10 to the bed 62 of a truck 64 or similar vehicle, as described and illustrated in FIGS. 4 and 6, a stand 200 is illustrated including two pairs of opposing legs 202, 204 which elevate from a base portion including opposing runners 206, 208 to a pair of matched pair of opposing post openings 210, 212 situated centrally on cross bars 214, 216. With reference to FIG. 7, the support structures 16 and 18 are illustrated as being slidably received within the post openings 210, 212 of the stand 200 along phantom lines 218.

As with the support structures 16, 18, the stand 200 is preferably made of strong materials, including but not limited to, steel, iron, aluminum, wood and polycarbonate, sufficient to support at least one hundred pounds of weight. If desired, the stand can be formed from segments of separated runners 206, 208, legs 202, 204, and cross bars 214, 216 for ease in storage and transportation.

Reference is now made to FIG. 8 for an alternative embodiment of the vehicle bed hammock 10 illustrating components enabling the hammock 10, as previously described, to be attached to a standard trailer hitch (not illustrated) situated at the rear of a vehicle and underneath the bumper. This embodiment uses the same hammock 10 structure as previously described. The supporting structure includes a T-section 300, preferably made of a strong inflexible material, such as steel or the like. In this embodiment, two L-shaped support structures 302, 304 form the supports for holding the hammock bed 12. The support structures include an upright support post 306, 308 attached to a slidably extending attachment post 310, 312. The upright posts 306, 308 include an open channel at the distal ends 307, 309 of the posts 306, 308 such that the center posts 36, 38 of the support structures 16, 18 can slidably fit within the open channels of the posts 306, 308. It is also within the scope of this embodiment of the present invention to dispense with the center posts 36, 38. In this manner, the posts 306, 308 could be attached directed to the cross bars 32, 34 to form a one piece unit comprising a cross bar 32, 34, upright support post 306, 308, and attachment post 310, 312.

The T-section 300 includes a trailer hitch post 314 having a distal end 316 and a proximal end 318. The distal end 316 includes a standard hitching mechanism 320, known to the art, for slidably inserting and attaching the distal end 316 of the trailer hitch post 314 into a trailer hitch receiving unit fastened to the rear of a vehicle (not illustrated). The proximal end 318 of the trailer hitch post 314 is attached to a cross bar 322 preferably, but not necessarily, at a right angle at the midpoint 324 of the cross bar 322. Each of the ends 326 of the cross bar 322 are adapted to slidably receive the attachment posts 310, 312 of the support structures 302, 304, as illustrated in FIG. 8, thereby attaching the hammock 10 to the T-section 300. A locking bolt 328 traverses openings in the cross bar 322 and each of the attachment posts 310, 312 to secure to support posts 306, 308 to the T-section 300. Advantageously, each attachment post 310, 312 can be provided with a series of openings placed along the length of the attachment posts 310, 312 for receiving the locking bolt 328. In this manner, the length of the hammock bed 12 can be adjusted as needed.

In this manner, the present invention provides a unique convertible hammock 10 equally adapted for placement on the ground by means of the stand 200 or placement on the bed 621 of a vehicle such as a pickup truck 64, or attached to a vehicle trailer hitch by means of the T-section 300. While the bed 62 of a pickup truck 64 is described and illustrated in this disclosure, other vehicles or structures may be contemplated for adapting the convertible hammock, such as the sides of a boat or other water vehicle.

When the hammock 10 is not in use, it can be removed from its receptacles and folded and stored away.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within the range, whether specifically disclosed or not. Further, these numerical ranges should be construed as providing support for a claim directed to any number of subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated reference, the patent disclosure controls.

The devices, methods, compounds and composition of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat.

I claim:

1. A convertible hammock for placement on the ground and on a vehicle, comprising:
   a. a first and second support structure, wherein each support structure comprises a center post having a first and second end, wherein the first end of the center post is rigidly attached to a cross bar in a generally perpendicularly oriented manner with respect to the center post, wherein each cross bar has a first end and a second end;
   b. a fabric covering extending from the cross bar of the first support structure to the cross bar of the second support structure; and
   c. a first receptacle for receiving the second end of the center post of the first support structure and a second receptacle for receiving the second end of the center post of the second support structure, wherein the first and second receptacles maintain the center posts of the first and second support structures in a generally vertical position;
   wherein:
   I. the receptacles are attached to a trailer hitch support mechanism, which trailer support mechanism is adapted to be attached to a standard trailer hitch of a vehicle; and
   II. the trailer support mechanism comprises an extension bar having a first and second end, wherein the extension bar connects to the trailer hitch at its first end and extends from the trailer hitch to a generally perpendicularly placed support bar having first and second ends, wherein the first and second ends of the support bar extend to receive the receptacles.

2. The convertible hammock of claim 1, wherein the fabric covering is releasably attached to the cross bar of the first support structure and the cross bar of the second support structure.

3. The convertible hammock of claim 1, further comprising receiving channels positioned at the first and second ends of the cross bars and wherein the hammock further comprises a canopy having ends removably inserted in the receiving channels.

4. The convertible hammock of claim 1, further comprising a cup holder rotatably attached to at least one support structure.

5. The convertible hammock of claim 1 wherein the fabric covering includes utility pockets.

6. The convertible hammock of claim 1, wherein the first and second receptacles are attached to a ground support stand to enable the hammock to be used as a ground supported device.

7. The convertible hammock of claim 6, wherein the ground support stand comprises a pair of opposing legs having a base portion wherein the opposing legs elevate from the base portion and include opposing runners to the pair of matched and opposing first and second receptacles.

8. The convertible hammock of claim 1 wherein the first and second receptacles are formed within the side walls of a pick-up truck.

9. The convertible hammock of claim 1 further comprising at least one extension member connected to at least one support structure for extending the length of the convertible hammock.

10. The convertible hammock of claim 9 wherein the extension member is releasably connected to the at least one support structure.

11. The convertible hammock of claim 9 wherein the extension member comprises a vertically directed support for slidable placement within a receptacle and an arm for connecting the vertically directed support of the extension member to the at least one support structure.

12. The convertible hammock of claim 1 further comprising removable shims for placement within the receptacles, wherein the shims create an opening similar to the size of the center posts.

13. The convertible hammock of claim 1 wherein the first and second ends of the support bar slidably receive the center posts to adjust the length of the hammock.

14. A hammock for use on a vehicle having a trailer hitch, comprising:
   a. a trailer hitch support mechanism comprising an extension bar having a first and second end, wherein the extension bar connects to the trailer hitch at its first end and extends from the trailer hitch to a generally perpendicularly placed support bar having first and second ends, wherein the first and second ends of the support bar extend to receive hammock receptacles;
   b. a first and second support structure, wherein the first support structure comprises a first center post having a first and second end, wherein the first end is rigidly attached to a first cross bar in a generally perpendicularly oriented manner with respect to the first center post, and the second support structure comprises a second center post having a first and second end, wherein the first end is rigidly attached to a second cross bar in a generally perpendicularly oriented manner with respect to the second center post, wherein each cross bar has a first end and a second end, and wherein the second end of the first center post is slidably received within the first end of the support bar and the second end of the second center post is slidably received within the second end of the support bar; and
   c. a fabric covering extending from the cross bar of the first support structure to the cross bar of the second support structure.

15. The hammock of claim 14 wherein the first and second ends of the support bar slidably receive the first and second center posts to adjust the length of the hammock.

* * * * *